United States Patent [19]
Dillemuth et al.

[11] Patent Number: 6,056,490
[45] Date of Patent: May 2, 2000

[54] ANTI-ROTATIONAL FASTENING SYSTEM

[76] Inventors: Dan Dillemuth, 43 Church St.; Dave Pearson, 1973 Clifford Rd., both of Palo, Iowa 52324

[21] Appl. No.: 08/927,417

[22] Filed: Sep. 11, 1997

[51] Int. Cl.[7] ............................. F16B 39/02; F16B 13/06
[52] U.S. Cl. ............................. 411/271; 411/55; 411/325
[58] Field of Search ............................. 411/55, 60.2, 271, 411/325

[56] References Cited

U.S. PATENT DOCUMENTS

| | | | |
|---|---|---|---|
| 3,042,094 | 7/1962 | Liljeberg | 411/271 |
| 5,333,977 | 8/1994 | Sugawara | 411/271 |

FOREIGN PATENT DOCUMENTS

| | | | |
|---|---|---|---|
| 362413 | 1/1923 | Germany | 411/271 |
| 457893 | 6/1950 | Italy | 411/271 |
| 522347 | 7/1976 | U.S.S.R. | 411/271 |

*Primary Examiner*—Neill Wilson
*Attorney, Agent, or Firm*—Wayne H. Stoppelmoor, Jr.

[57] ABSTRACT

An anti-rotational fastening system consisting of a primary bolt or screw that is fabricated with an axial passage at the center of the drive head extending through the entire length. The threaded end has a tapered counterbore that is sectioned to provide radially expandable segments. The segments expand by means of an internally threaded conical shaped lock pin that is drawn into the tapered counterbore of the primary fastener by clockwise rotation of a secondary threaded device positioned in the axial passage. As these segments expand, clearance is reduced between the external threads of the primary member and the internal threads of the tapped hole or nut of the bolted connection. Frictional resistance to rotation is increased as the clearance between the threads decrease. The friction increases to a point where the fastening system is locked and resists all but deliberate loosening of the bolted connection.

15 Claims, 9 Drawing Sheets

FIG. 10

ANTI-ROTATIONAL FASTENING SYSTEM

FIELD OF THE INVENTION

The field of the invention relates to mechanical fasteners.

BACKGROUND OF THE INVENTION

The use of threaded mechanical fasteners are widespread and provide an indispensable means of assembly in nearly all products and components whether for industrial or consumer usage. While threaded fasteners allow reliable and consistent connection between mating components in static conditions, dynamic loading, stress reversals, thermal expansion, and vibration cause conventional threaded fasteners to loosen.

Manufacturing tolerances and thread allowances inherently provide thread clearance between the external thread of a screw or bolt and the internal threads of a tapped hole or nut. These clearances combined with the aforementioned dynamic loadings reduce the threaded fastener's frictional resistance to rotation. When this frictional resistance is reduced, even for a micro second, the same tensile force in the bolt or screw that was developed from the initial installation torque allows the mating threads to slide down the ramp of the helix angle a minute amount. Over a number of cycles, the motion continues until the bolt pre-load is completely lost resulting in joint separation. Threaded fasteners can then fail or fall completely out. Depending on the application, this failure can be catastrophic.

During dynamic cycling, service loads impact the threads causing the crest of the threads to shear. In time, the threads, internal and external can be damaged to the point where they cannot be reused or the assembly cannot be conveniently disassembled. This can result in significant expense in the form of repair or component replacement.

Gasketed joints in high vibration environments must have sufficient bolt pre-load to resist loosening. This pre-load can exceed the strength of the gasket material resulting in an unsealed joint.

The need arises for a fastening system to overcome the aforementioned problems.

SUMMARY OF THE INVENTION

The present invention provides an externally threaded fastener with radially expandable longitudinal externally threaded segments. As these external threads of the fastening system expand into the mating internal threads of the tapped hole or nut by means of a conical wedge mechanism, clearances between mating threads is reduced. Frictional resistance is proportionally increased to a point where the external threads are locked into the internal threads regardless of fastener pre-load.

Accordingly, an object of the invention is a threaded fastening system which can resist rotation and loosening while being reusable and without causing damage to the mating threads. Another object of the invention is to provide a fastening system which can lock regardless of fastener pre-load and position. A further object of the invention is a fastening system that can be utilized effectively in a hole or nut with worn or damaged threads.

Yet another object of the invention, is a fastening system that will retain the nominal pre-load of rated size in a tapped hole or nut with worn or damaged threads.

Other and further advantages, embodiments, variations and the like will be apparent to those skilled in the art from the accompanying drawings and appended claims.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and will be described in detail. It should be understood, however, that it is not intended to limit the invention to the particular form described. On the contrary, the invention is to cover all modifications, equivalents and alternatives falling within the spirit and scope of the invention as defined by the appended claims.

DETAILED DESCRIPTION OF THE PREFERRED EMBODIMENTS

Figure 1:
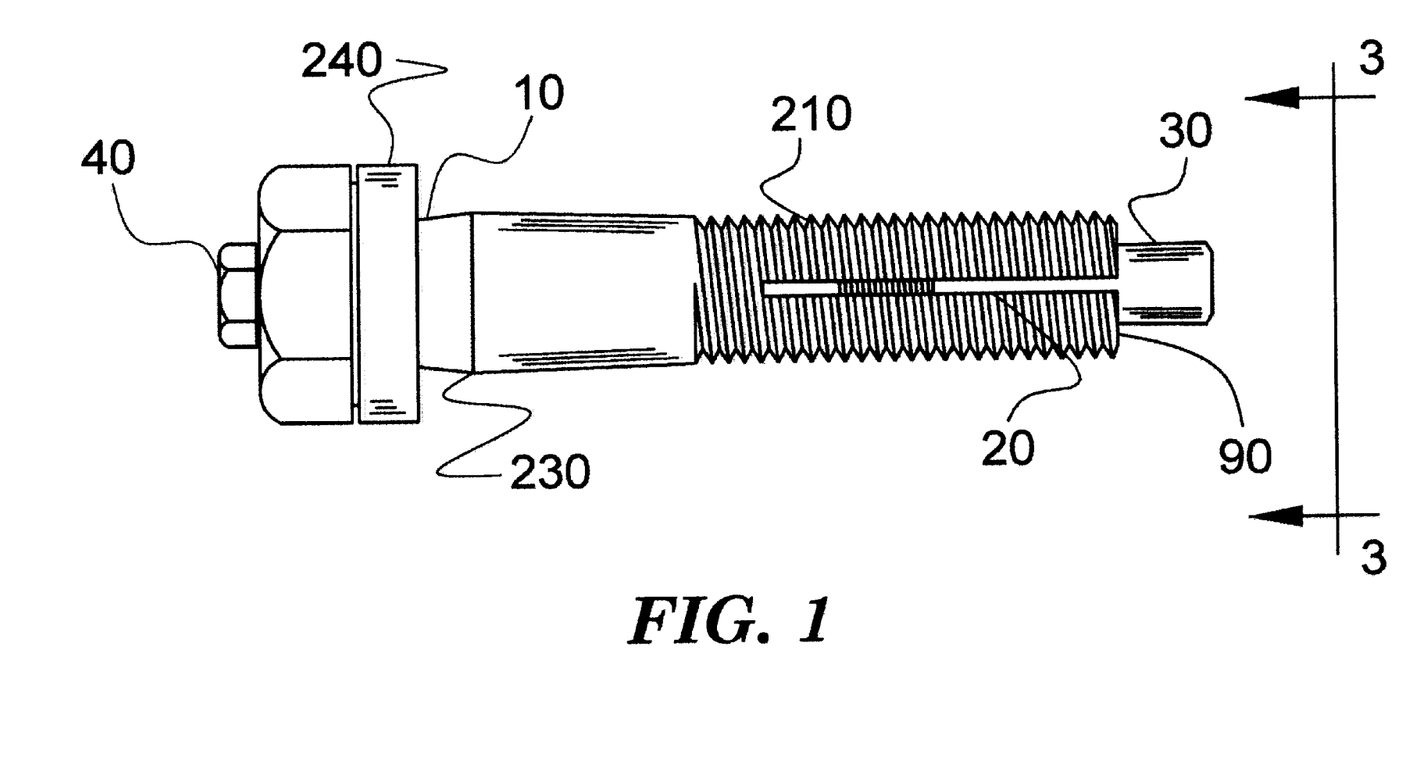
FIG. 1 is a side view of the anti-rotational fastening system including the expansion mechanism in the unlocked position.
Figure 2:
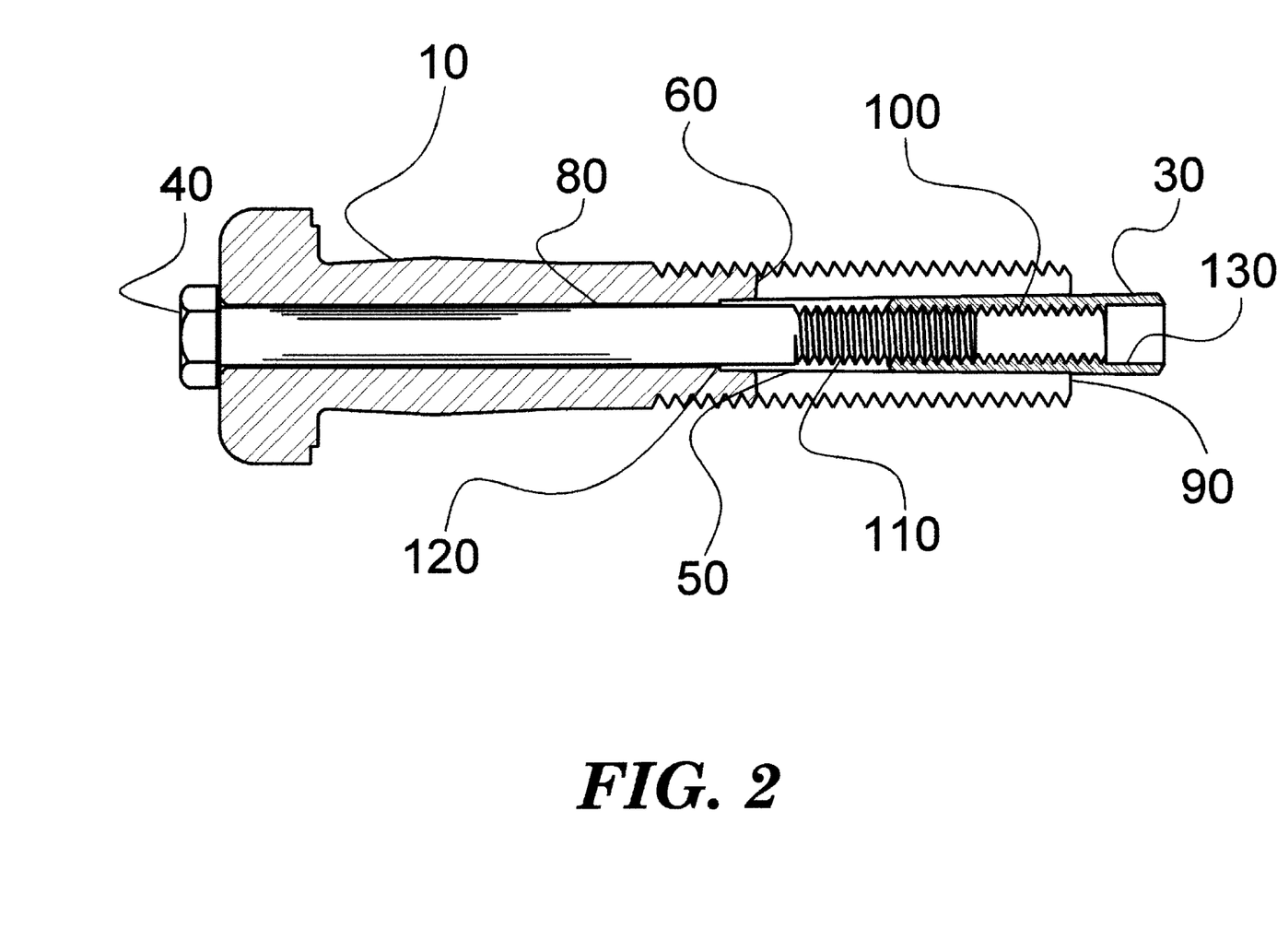
FIG. 2 is a cross sectional side view of the fastening system in FIG. 1 showing the internal details of the expansion mechanism.
Figure 3:
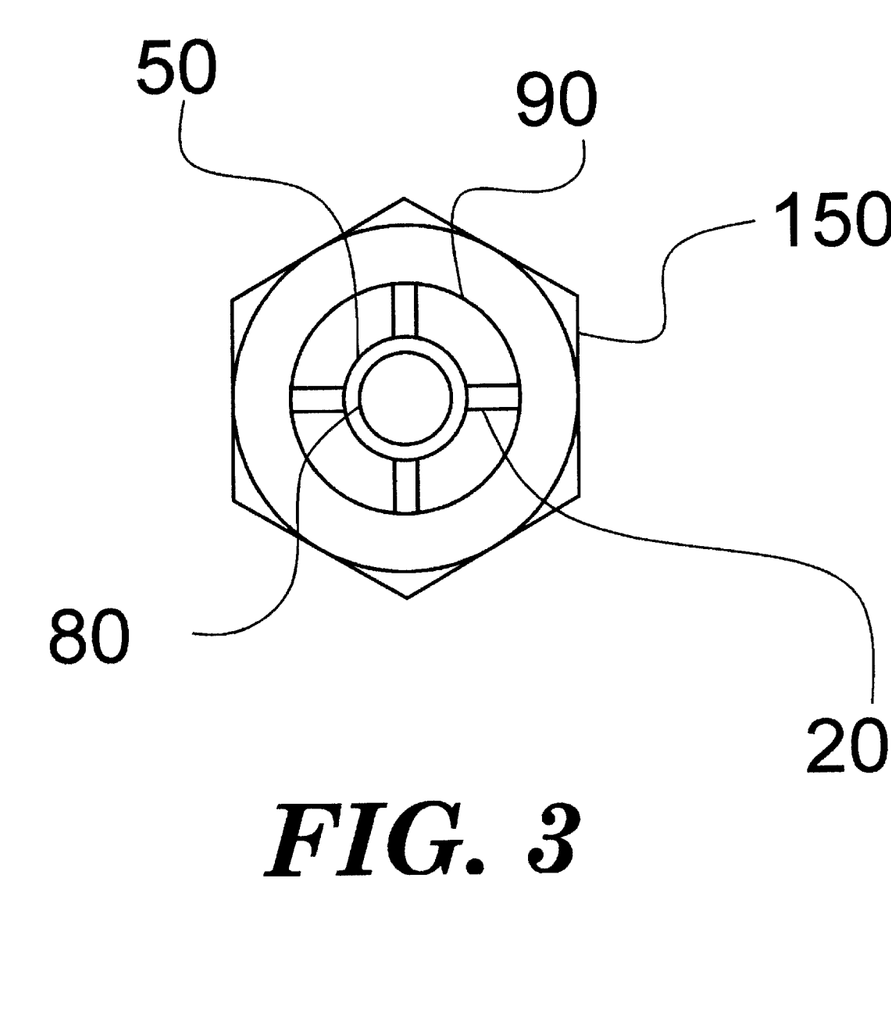
FIG. 3 is an end view of fastening system shown in FIG. 1 showing the expansion mechanism.

Referring to FIGS. 1, 2, and 3, these figures show the principle elements of the fastening system in the unlocked position. The fastening system is preferably fabricated with a primary member 10 as a bolt or screw with a tapered counterbore 50 at one end, and an axial cylindrical passage 80 at the end opposite of the tapered counterbore 50. The primary member 10, of the present invention is shown with evenly spaced longitudinal slots 20 which divide the threaded end and tapered counterbore 50 into separate radially expandable segments 90. A washer retaining feature 230 is shown in FIG. 1. The washer retaining feature captivates the washer 240 under the hexagonal drive head 150 of the primary member 10. The washer is positioned on the fastening system by forcing it over the localized increase in diameter of the shank of the primary member. A secondary threaded member 40, includes external threads 110 that advance the conical shaped lock pin 30 into the tapered counter bore when rotated counter clockwise.

In FIG. 2, a lock pin travel limiting feature 120, is positioned at the smaller end of the tapered counterbore. This feature is prevents the lock pin 30 from advancing to a position beyond the end of the primary fastener, thus maintaining maximum expandability of the longitudinal threaded segments.

Figure 4:
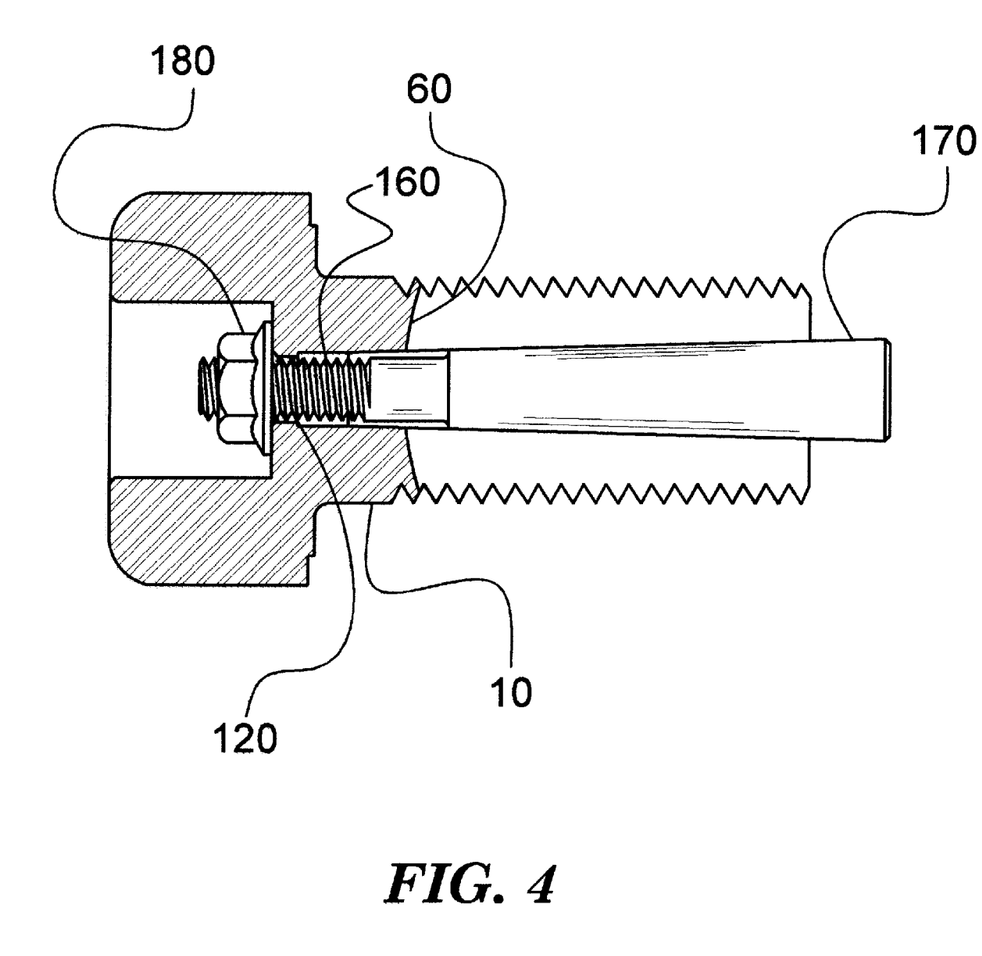
FIG. 4 is a cross sectional side view of the fastening system showing the internal details of an alternative expansion mechanism.

In FIGS. 1, 2, and 3, the lock pin 30 consists of an externally tapered member that matches the tapered counterbore 50 of the primary member 10. The lock pin 30 also incorporates internal threads 100 that match the external threads 110 of the lock bolt 40. In FIG. 2, the conical shaped lock pin 30, includes a counterbore 130, which limits the thread length of the internal threads maintaining ease in tapping the bore. The lock pin 170 shown in FIG. 4 consists of the same taper characteristics of that of lock pin 30 in FIGS. 1, 2, and 3, with the exception of the internal threads 100. The tapered lock pin 170 shown here includes a integral externally threaded extension 160. A flanged nut 180 is used with the threaded extension as a rotational drive device advancing the solid conical shaped lock pin into the tapered counterbore expanding the threaded radial expansion segments 90.

The longitudinal slots 20, in FIG. 1 terminate in a radius 60 based on the diameter of the cutting tool which provides a means of distributing the stress from expansion of the threaded segments.

Figure 7:
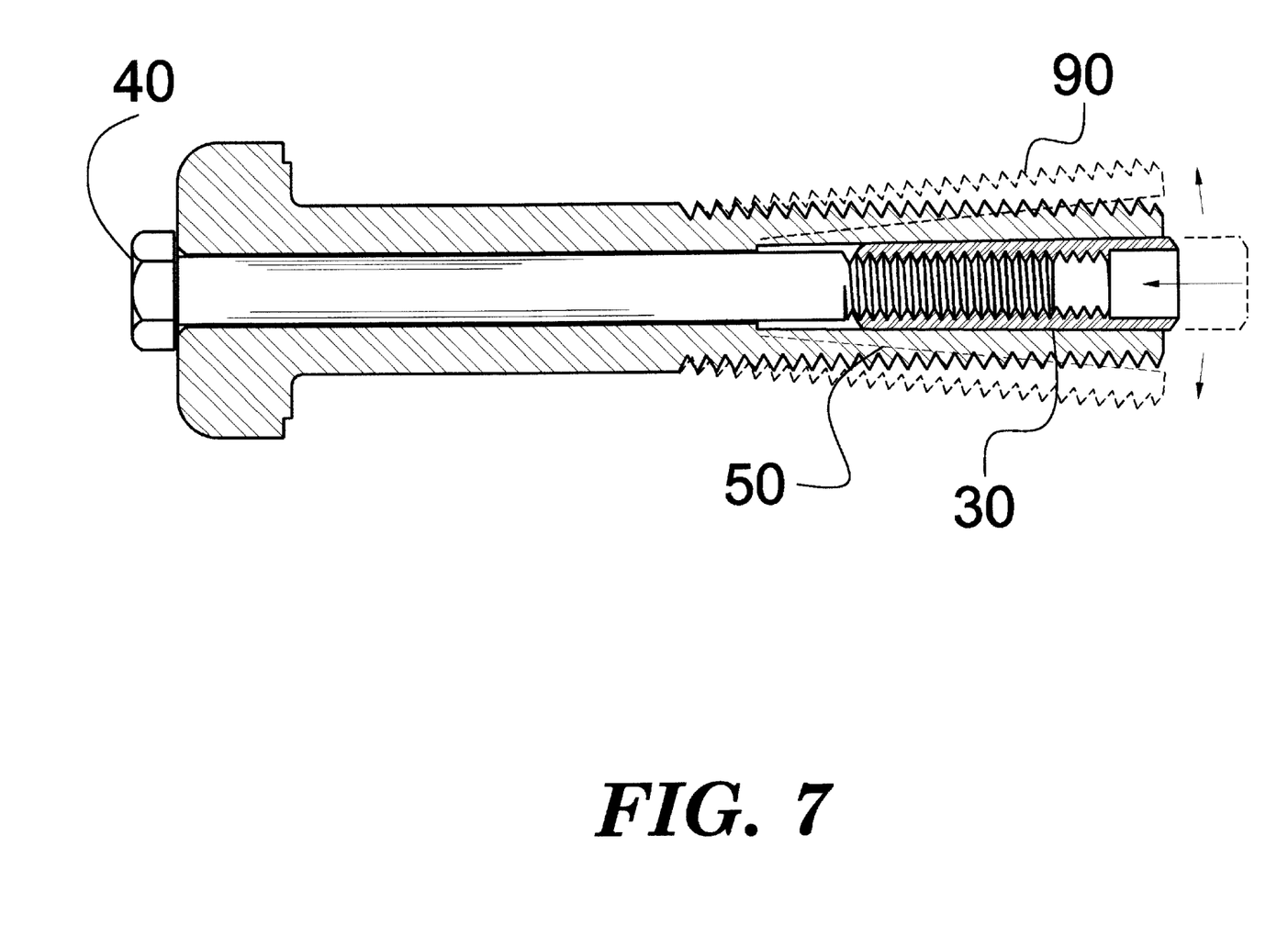
FIG. 7 is a cross sectional side view of the fastening system in FIG. 1 showing the expansion mechanism in locked position.
Figure 8:
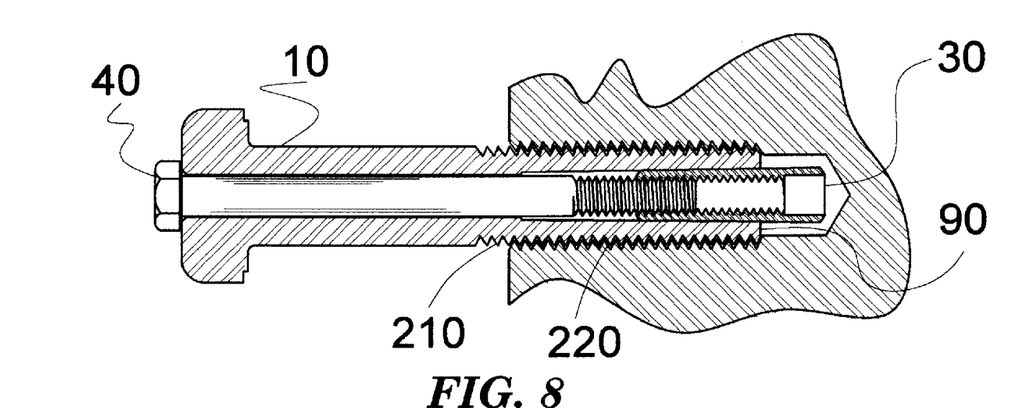
FIG. 8 is a cross sectional view of the fastening system in FIG. 1 showing the expansion mechanism in the unlocked position relative to the mating internal threads of a tapped hole.
Figure 9:
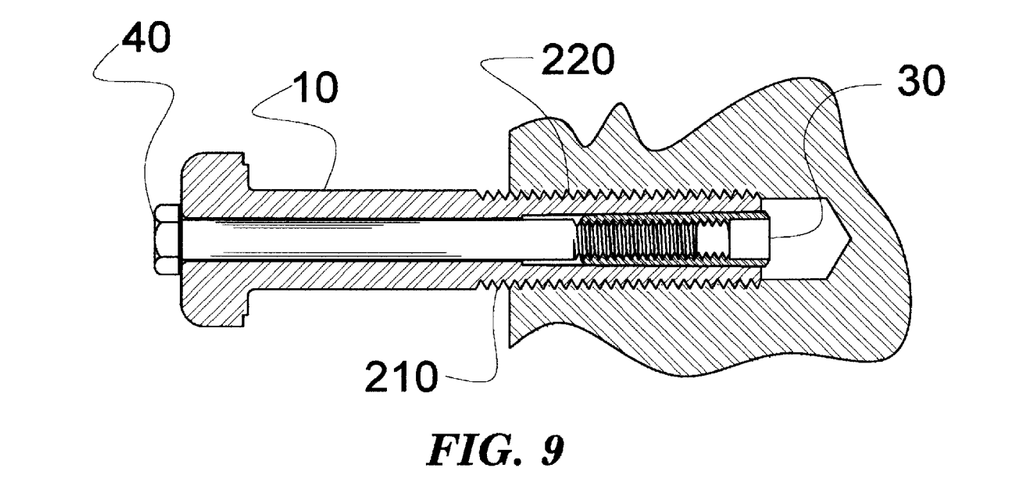
FIG. 9 a cross sectional view of the fastening system in FIG. 1 showing the expansion mechanism in the locked position relative to the internal threads of the tapped hole.

Referring to FIGS. 7, 8, and 9, considering the locking operation of the fastening system, which is typical for all embodiments shown, the tapered lock pin 30 and advances in a direction opposite of the tapered counterbore 50 in the primary member 10 along the main axis by tightening or clockwise rotation of the lock bolt 40. As the tapered lock pin 30 advances, it forces the radially expandable segments 90 of the primary member 10 generally outward, perpendicular to the main axis of the fastening system. Considering a typical bolted joint, clearance between the external threads of the fastening system's primary member 210 and the mating internal threads 220 of the tapped hole or nut is eliminated as the expandable segments 90 expand into the internal threads 220. With this elimination of clearance, frictional resistance to rotation is increased to a degree where the fastening system is locked resisting all but deliberate loosening. The expansion of the external threaded sections 90 shown in FIG. 7 continue until the recommended torque value of the lock bolt 40 is achieved. This results in a firmly seated lock pin 30 within the tapered counterbore 50 and firmly seated external threads of the primary fastener 210 within the internal threads 220 of the tapped hole or nut. The angle employed on the tapered counterbore 50 and tapered pin 30 is such that angle of friction creates a self retaining condition between the surfaces of the pin 30 and counterbore 50.

To release the lock pin 30 and external threads 210 for fastener removal and disassembly of the bolted joint, the frictional forces retaining the pin 30 must be overcome with sufficient axial force to release the external surface of the lock pin 30 and the tapered counterbore 50.

Figure 5:
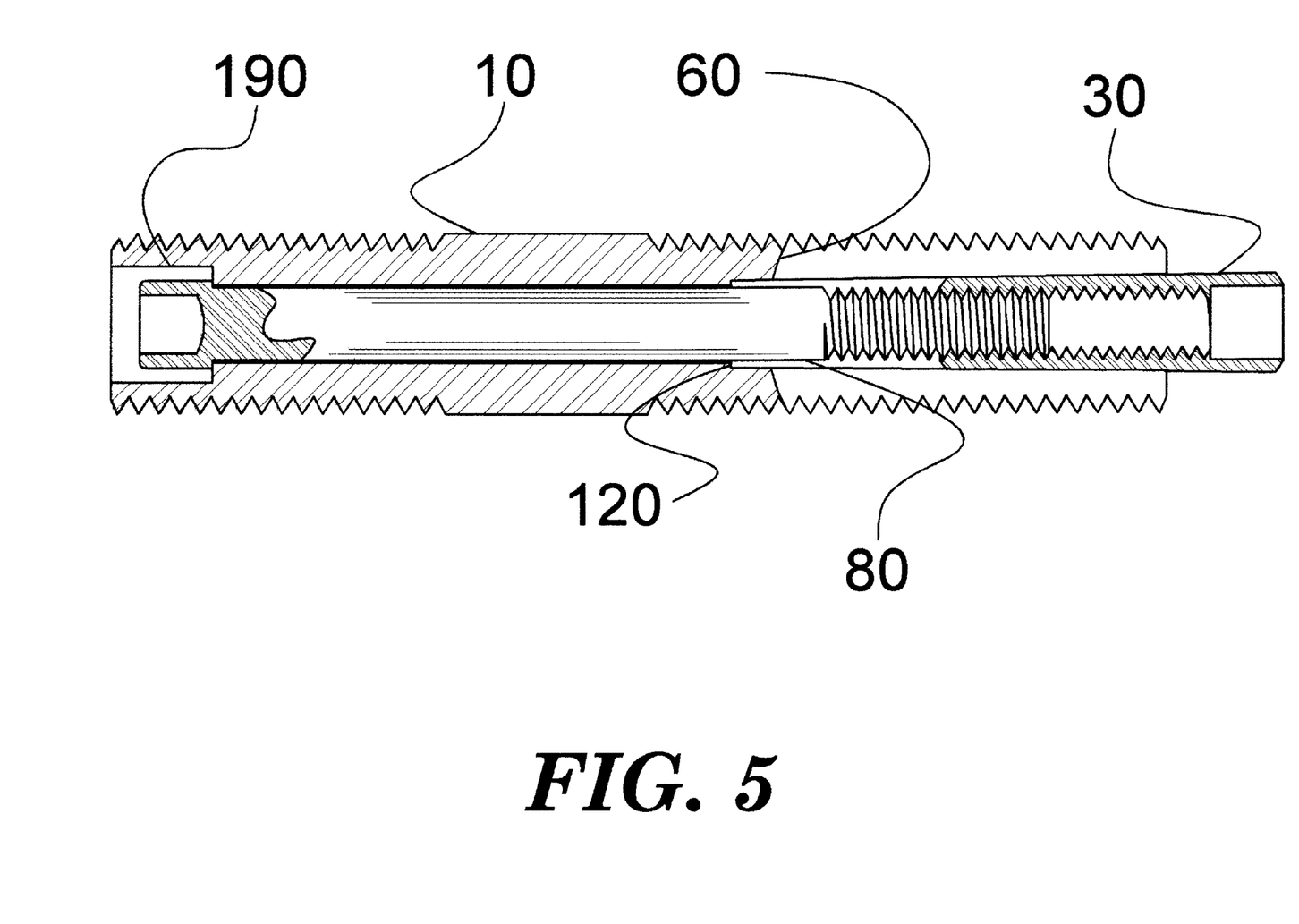
FIG. 5 is a cross sectional side view of the fastening system showing the primary member as a stud and the internal details of the expansion mechanism.

FIG. 5 shows an alternative embodiment in the form of a stud. This form of the invention is capable of utilizing either method of locking the expandable external threads 210 of the primary member by means of the internally threaded lock pin 30 as shown in FIGS. 1, 2, and 3, or the style shown in FIG. 4 which incorporates the integral externally threaded extension 170. The primary member of this embodiment includes a counterbore 190 to recess the head of the secondary threaded member.

Figure 6:
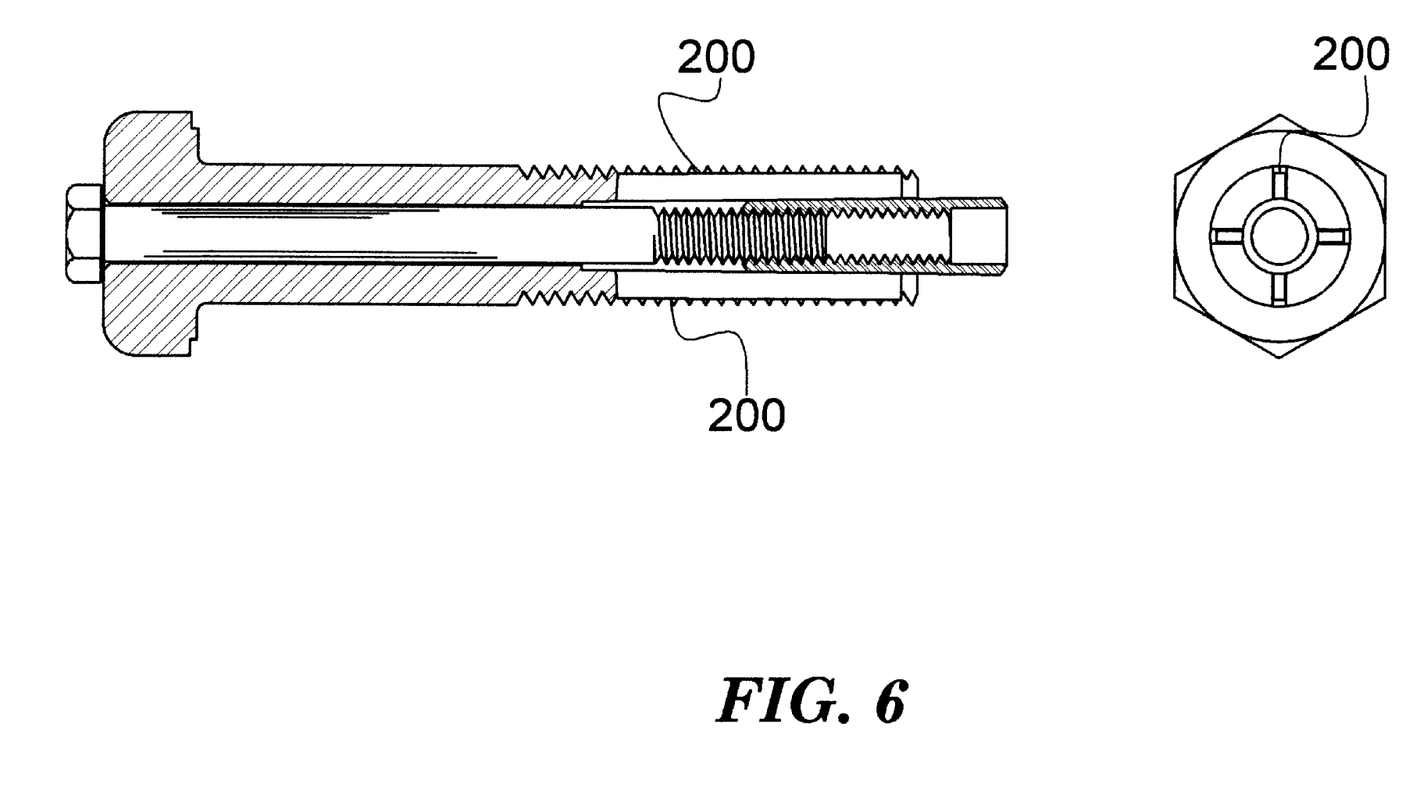
FIG. 6 is a cross sectional side view of the fastening system showing an optional component for increased frictional resistance with mating internal threads.

Referring to FIG. 6, a thin insert of an easily deformable material 200 which has the shape of one side parallel with the main axis of the fastener with the side opposite to be parallel with the external surface of the tapered pin 30. The insert 200 is positioned such that the tapered side corresponds with the external surface of the tapered pin 30. As the pin advances along the tapered counterbore in the primary member, it drives the insert 200 outward perpendicular to the main axis of the fastening system, creating additional interference and increased frictional resistance with the mating threads of the tapped hole or nut in the bolted joint. This insert can be utilized with all of the embodiments shown.

Figure 10:
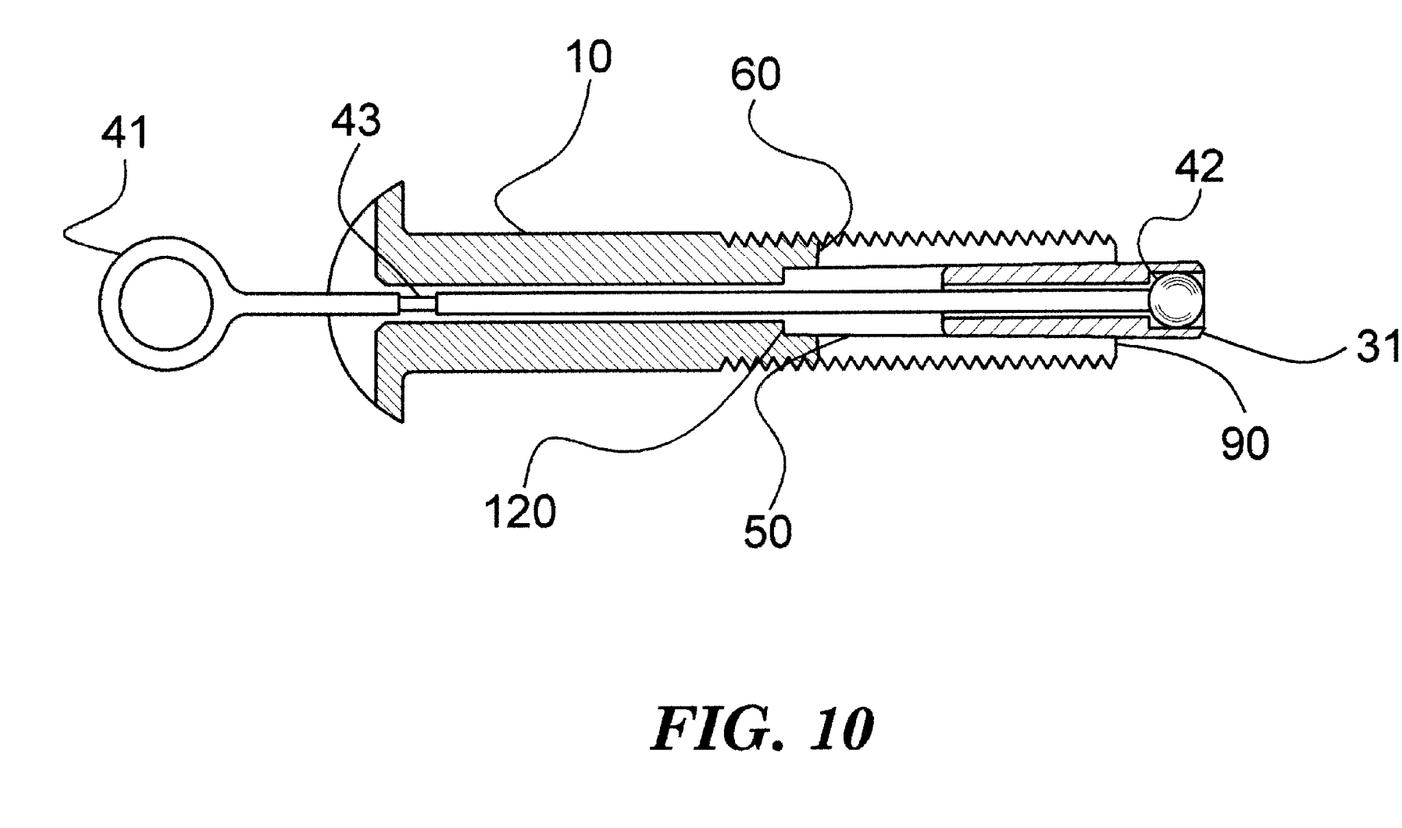
FIG. 10 is a cross sectional view of the fastening system as alternative embodiment utilizing a filament as a draw mechanism to expand the longitudinal threaded segments.

FIG. 10 shows an alternative embodiment utilizing a filament 41 as a mechanism for expansion of the threaded segments 90. The filament incorporates a spherical ball 42 that interacts with the counterbore in the conical shaped lock pin 31. The diameter of the sphere being larger than the passage in the lock pin pulls the lock pin into the counterbore as the filament is pulled from an external source. The filament 41, includes a feature of reduced cross section 43 that breaks away a pre determined tension to seat the conical lock pin at maximum expansion of the threaded sections.

While particular embodiments and applications of the present invention have been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing from the spirit and scope of the invention as defined in the appended claims.

What is claimed:

1. A threaded fastening system comprising:
   a primary member having a first and second end, the first end having radially expandable longitudinal threaded segments centrally oriented about a tapered counter bore; the second end including an axial cylindrical passage extending therethrough intersecting the tapered counter bore;
   a secondary externally threaded member positioned inside the axial cylindrical passage of the primary member; and
   a conical shaped member including internal threads that match the external threads of the secondary threaded member and external surfaces that match the internal surfaces of the tapered counter bore of the primary member;
   the conical shaped member including a counter bore disposed in a largest end that minimizes the length of the internal threads.

2. The threaded fastening system of claim 1, wherein the tapered counter bore is at such a length as to limit the travel on the conical shaped member at a position of maximum expandability of the radially expandable longitudinal threaded segments of the primary member.

3. The threaded fastening system of claim 1, wherein said primary member includes a hexagonal drive head for deliberate tightening and loosening of the primary member.

4. The threaded fastening system of claim 1, wherein the longitudinal threaded segments of the primary member are of equal cross section separated by longitudinal slots of a length to provide sufficient expandability as the conical shaped member is advanced along the axis of the fastening system by clockwise-wise rotation of the secondary externally threaded member.

5. The threaded fastening system of claim 4, wherein the longitudinal slots terminate in a radius with a center on the primary axis of the fastening system for providing a means for eliminating high stress concentrations from developing during the expansion of the longitudinal threaded segments.

6. The threaded fastening system claim 4, wherein the longitudinal threaded segments increase the frictional resistance of the threads to loosening relative to a tapped hole or nut of a bolt connection by the amount of expansion produced by the axial position of the conical shaped member within the tapered counter bore.

7. The threaded fastening system of claim 4, wherein the longitudinal threaded segments provide a means for reducing the torque required to remove or loosen the fastening system from a bolted connection when the conical shaped member is forced in the direction of a large end of the tapered counter bore; whereby as the conical shaped member moves in the direction of the large end of the tapered counter bore, tensile forces develop in the longitudinal threaded segments from initial preload of the fastening system force the longitudinal threaded segments inward, perpendicular to the axis of the primary member, thereby releasing the external threads of the primary member from the internal threads of a tapped hole or nut of a bolt connection.

8. The threaded fastening system of claim 3, wherein the primary member further including a washer retaining feature to secure a washer, having an aperture therein, under the drive head, as an assembly with the primary member, secondary externally threaded member, and conical shaped member; the retaining feature comprising a gradual increase of outside diameter of the second end of the primary member in a generally tapered shape until a maximum diameter is achieved and then gradually returns to an original diameter of the second end; wherein the position of the maximum diameter of the retaining feature is located relative to the drive head of the primary member to give appropriate working clearance for the washer; whereby the maximum diameter of the retaining feature is of a size to create an interference fit with the washer and the original diameter of the second end is such that clearance is achieved between the aperture of the washer and the second end.

9. The threaded fastening system of claim 1, wherein the conical shaped member includes angled surfaces that are self locking to provide sufficient frictional resistance relative to the surfaces of the tapered counter bore to the lock the conical shaped member firmly in place against the surface of the tapered counter bore.

10. The threaded fastening system of claim 1, wherein the conical shaped member includes angled surfaces matched to the surface of the tapered counter bore to keep full contact against the tapered counter bore surfaces as the conical shaped member advances along the tapered counter bore through the entire range of motion.

11. The threaded fastening system of claim 9, wherein the conical shaped member includes internal threads that match the external threads of the secondary externally threaded member.

12. The threaded fastening system of claim 1, wherein the secondary externally threaded member includes threads of a length that advance the conical shaped member to a position that produces maximum expandability of the radially expandable longitudinal threaded segments of the primary member.

13. The threaded fastening system of claim 4, further including an insert comprising easily deformable material generally rectangular in shape with one end angled to match the surface of the conical shaped member and of a width to fit into the longitudinal slot.

14. The threaded fastening system of claim 1, including capability to hold a standard clamp load in worn or damaged tapped holes or nuts not capable of holding the standard clamp load.

15. A threaded fastening system comprising:

a primary member having first and second ends disposed at opposite ends of an axis, the first end having radially expandable longitudinal segments of equal cross section centrally oriented about a tapered bore having internal surfaces therein, the longitudinal segments having threads disposed external thereof, the second end including an axial cylindrical passage extending therethrough intersecting with the tapered bore;

a second member, having external threads thereon, disposed inside the axial cylindrical passage of the primary member;

a conical shaped member including internal threads that match the external threads of the second member and external surfaces that match the internal surfaces of the tapered counter bore of the primary member; and longitudinal slots, disposed between the longitudinal segments of the primary member, having sufficient length for expansion of the longitudinal segments when the conical shaped member is advanced along the axis of the primary member by rotation of the second member; wherein the longitudinal slots terminate in a radius with a center on the axis of the primary member for eliminating high stress concentrations from developing during the expansion of the longitudinal threaded segments.

* * * * *